Aug. 23, 1966 T. HUDSPETH ETAL 3,268,795
MICROWAVE FREQUENCY DOUBLER
Filed Nov. 14, 1962 3 Sheets-Sheet 1

INVENTORS.
THOMAS HUDSPETH,
HARMON H. KEELING,

Paul M. Coble
ATTORNEY.

Aug. 23, 1966 T. HUDSPETH ETAL 3,268,795

MICROWAVE FREQUENCY DOUBLER

Filed Nov. 14, 1962 3 Sheets-Sheet 3

3,268,795
MICROWAVE FREQUENCY DOUBLER
Thomas Hudspeth, Malibu, and Harmon H. Keeling, Los Angeles, Calif., assignors to Hughes Aircraft Company, Culver City, Calif., a corporation of Delaware
Filed Nov. 14, 1962, Ser. No. 237,576
10 Claims. (Cl. 321—69)

The present invention relates to the transmission of microwave energy, and more particularly relates to a parametric frequency multiplier for doubling the frequency of unbalanced microwave signals with high efficiency. The invention described herein was made in the performance of work under a NASA contract and is subject to the provisions of the National Aeronautics and Space Act of 1958, Public Law 85-568 (72 Stat. 426; U.S.C. 2451), as amended.

Frequency doublers for microwave signals are finding ever increasing applications in the field of communications, and particularly in the transmission of UHF and higher frequency signals for radio, television, and other intelligence transmission systems. One particular use for a microwave frequency doubler is in a multiplier chain and transistor driver for a crystal controlled local oscillator of a superheterodyne receiver. A further application of such a frequency doubler is in a microwave beating source for a balanced modulator.

A simple and efficient parametric frequency multiplier which provides output signals at a desired even harmonic frequency of the input signal has been developed which utilizes a pair of variable reactance diodes connected to a common input terminal to develop from a fundamental input frequency both odd and even harmonic signals of the fundamental frequency. The odd harmonic signals developed by the respective diodes are in phase with each other, and the even harmonic signals are 180° out of phase with one another. A resonant circuit tuned to a desired even harmonic frequency of the fundamental frequency is connected to the diodes in a push-pull arrangement so that the in phase signals (odd harmonics) cancel and the out of phase signals (even harmonics) combine, thereby providing the desired even harmonic output signal.

In accordance with the foregoing, it may be observed that in the event the output circuit is excited by the symmetric (parallel) mode of the signals developed by the variable reactance diodes rather than the antisymmetric (push-pull) mode, the output circuit would combine the in phase components (odd harmonics) and cancel the out of phase components (even harmonics), thereby providing an odd harmonic output signal of the fundamental input signal. It will thus be apparent that in order to improve the efficiency of a parametric frequency multiplier, coupling of the output circuit for excitation by the desired mode must be maximized while stray coupling with excitation in the undesired mode must be minimized. The present invention is primarily directed toward the accomplishment of this objective.

More specifically, a principal object of the present invention is to provide an efficient parametric frequency doubler of the type employing variable reactance diodes to develop the double frequency signal and in which output excitation by the antisymmetric mode is maximized while excitation by the symmetric mode is minimized.

It is a further object of the present invention to provide a frequency doubler for microwave signals which not only operates with maximum efficiency and reliability, but which also is of minimum size and complexity.

It is a still further object of the present invention to provide a device for efficiently doubling the frequency of microwave energy, and which device may be readily incorporated into a cascaded chain of frequency multipliers for use in a microwave communications system.

It is still another object of the present invention to provide a parametric frequency multiplier for doubling the frequency of microwave input signals which receives an unbalanced coaxial input signal, develops the desired double frequency signal in a balanced circuit, and furnishes an unbalanced coaxial output signal, with minimum interference between the balanced and unbalanced modes and improved localization of the output circuit.

These and other objects are accomplished by the frequency doubler of the present invention which includes a transmission line for propagating energy in a symmetric mode at an input signal frequency. The input signal is coupled to a first portion of the transmission line, while first and second variable reactance devices are coupled to a second portion of the transmission line. The first and second variable reactance devices are mounted in a waveguide resonator tuned to an output frequency essentially equal to twice the input frequency. The variable reactance devices each develop signals at even and odd harmonic frequencies of the input frequency, with the odd harmonic signals developed by the first and second reactance devices being in a symmetric mode and the even harmonic signals developed by the first and second reactance devices being in an antisymmetric mode. The waveguide resonator supports the antisymmetric mode signals at the output frequency and attenuates energy in the symmetric mode as well as energy at frequencies other than essentially the output frequency. Output coupling means are provided in the waveguide resonator to extract energy at the output frequency.

With the above and other objects, advantages and features in view, as will hereinafter more fully appear, reference is now made to the following detailed description of preferred embodiments of the present invention taken in connection with the annexed drawings in which.

Figures 1, 2:
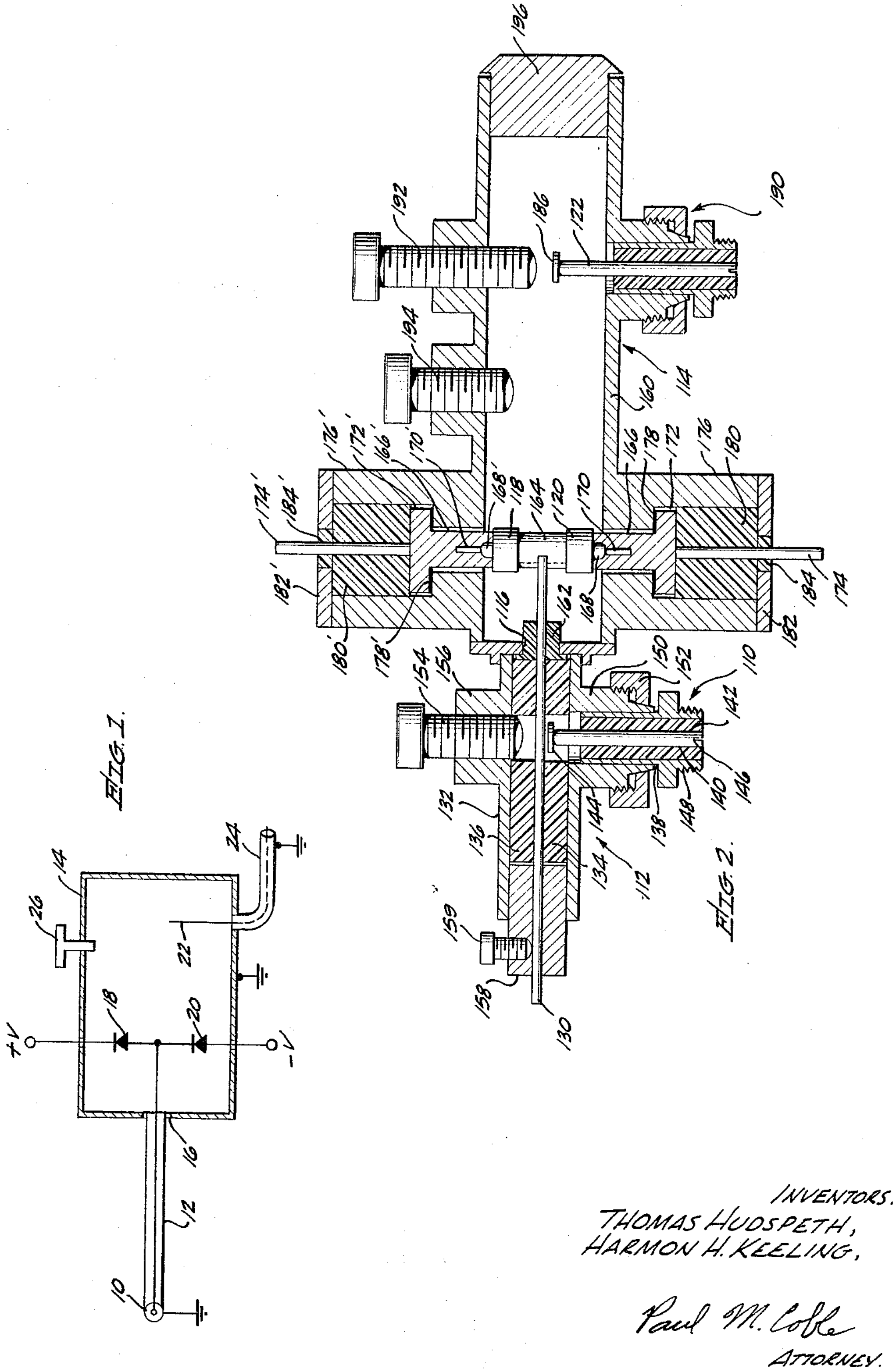
FIG. 1 is a schematic diagram illustrating a microwave frequency doubler according to the present invention.
FIG. 2 is a longitudinal sectional view of a frequency doubler provided according to one embodiment of the invention.

Referring now to the drawings, and in particular to FIG. 1, the microwave frequency doubler of the present invention will be described in more detail. A microwave input signal whose frequency is to be doubled is applied via a coaxial input connection 10 to a transmission line 12, which in a preferred embodiment of the invention may include a strip-type conductor. The strip transmission line 12 extends into a waveguide resonator, or cavity, 14 through an aperture 16 in one of its end walls. The cavity 14 is made resonant at a frequency essentially equal to twice the input signal frequency. A pair of variable reactance devices 18 and 20, preferably semiconductor diodes of the varactor, or variable reactance, type are mounted in the resonator 14, with the anode of the diode 18 and the cathode of the diode 20 connected to a common terminal at the end of the strip transmission line 12 located in the resonator 14. The varactor diodes 18 and 20 may be reverse biased by applying a positive potential to the cathode of the diode 18 and a negative potential to the anode of the diode 20, as shown in FIG. 1. An output coupling probe 22, which extends into the waveguide 14 at a desired distance from the diodes 18 and 20, is connected to the inner conductor of a coaxial output transmission line 24 which provides the microwave output signal at twice the frequency of the input signal. The resonant frequency of the cavity resonator 14 may be varied by means of an adjustable tuning element 26.

Figure 3:
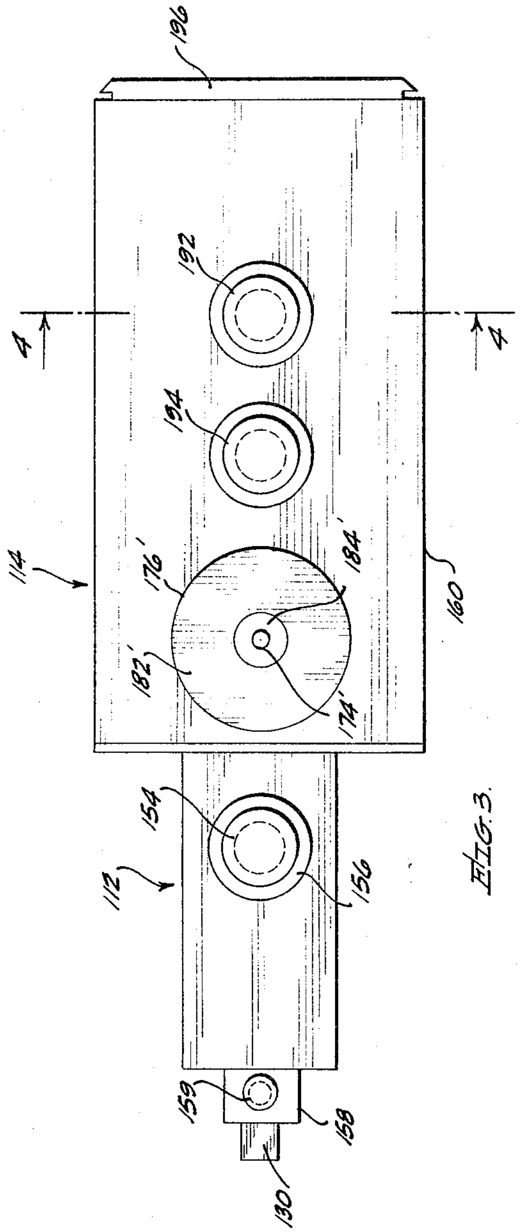
FIG. 3 is a plan view of the frequency doubler shown in FIG. 2.
Figure 4:
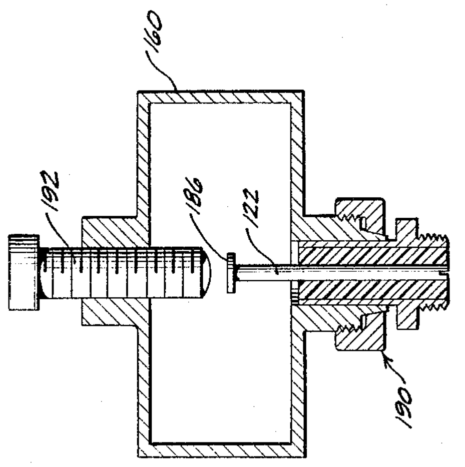
FIG. 4 is a cross-sectional view taken along line 4—4 of FIG. 3.

The constructional features of the frequency doubler provided according to one embodiment of the present invention are illustrated in FIGS. 2–4. The frequency doubler includes a strip transmission line assembly 112 for propogating microwave energy at the input frequency and a waveguide resonator assembly 114 tuned to twice the input frequency. In the strip transmission line assembly 112 a metal strip 130 is centrally mounted in an elongated metal housing 132 between insulating members 134 and 136.

A microwave input signal is applied to the strip line through a coaxial input connector assembly 110. The assembly 110 includes an electrically conductive sleeve 138 and a conductive rod 140 coaxially disposed within the sleeve 138 and insulated therefrom by means of a tubular insulating element 142. The end of the conductor 140 nearest the strip line is terminated in a plate-like portion 144 to provide a capacitive coupling with the metal strip 130. The other end of the conductor 140 may be provided with a pin-receiving hole 146 to accommodate a connector pin at the end of the inner conductor of a coaxial cable (not shown), while the outer lateral surface of the sleeve 138 may be threaded at 148 to mesh with corresponding threads on the outer conductor of the coaxial cable. The illustrated means for connecting the assembly 110 to a coaxial input cable is, of course, exemplary and it will be apparent that connection to an input coaxial cable may be afforded in numerous other ways.

A variable capacitive coupling with the strip line 130 may be achieved by sliding the sleeve 138 and rod 140 within outwardly projecting tubular portion 150 of the strip line housing 132. The sleeve 138 may be rigidly secured to its housing 150 at the desired axial position by tightening a nut, or collet, 152 disposed about the outer end of the housing 150.

Tuning of the strip line assembly 112 to the desired input frequency is afforded by varying the penetration depth of a tuning plug, or screw, 154 disposed within tubular portion 156 of the strip line housing 132, which tubular portion projects outwardly from the housing 132 at a location opposite the coaxial input assembly 110 in the embodiment of FIGS. 2–4. Additional adjustment of the resonant frequency of the strip line assembly 112 may be afforded by a short circuiting member 158 disposed about the metal strip 130 at the end of the housing 132 remote from the waveguide resonator assembly 114. The short circuiting member 158 is movable longitudinally along the strip 130 and may be rigidly affixed to the strip 130 at the desired location by tightening of a set screw 159 in the member 158. The variable position short circuiting member 158, as well as the tuning screw 154 and movable conductor 140, also affords an input impedance level control for optimizing the impedance match between the input transmission line and the varactor diodes in the waveguide resonator.

The waveguide resonator assembly 114 includes a rectangular cross-section waveguide resonator 160, one end of which is disposed adjacent the end of the strip line assembly 112 remote from the short circuiting element 158. The end of the waveguide resonator, or cavity, 160 adjacent the strip line assembly 112 defines an aperture 116 to accommodate the metal strip 130 and allow it to extend a short distance into the cavity 160. A plastic bushing 162 is disposed about the strip 130 adjacent the aperture 116 to securely hold the strip 130 while insulating it from the waveguide 160.

A pair of varactor diodes 118 and 120, which in the embodiment of FIGS. 2–4 may be gallium-arsenide diodes, are mounted in the waveguide resonator 160. Electrical connection between the anode of the diode 118, the cathode of the diode 120, and the metal strip 130 is afforded by a conductive sleeve 164 which is mounted between the inner ends of the diodes 118 and 120 and in contact with the end of the strip line 130. The diode 120 is mounted on a slotted cylindrical support member 166 of electrically conductive material, with contact stub 168 of the diode 120 being embedded in slot 170 of the member 166. An enlarged base portion 172 of the diode support member 166 is affixed to a conductor 174 which extends out of the assembly 114 for connection to a source of D.C. bias potential such as —V of FIG. 1. The support member 166 and the conductor 174 reside essentially within a tubular housing 176 which projects outwardly from the waveguide cavity 160. The surface of the base portion 172 of the support member 166 facing the waveguide 160 is insulated from the nearby inwardly projecting portion of the housing 176 by means of a mica washer 178, while insulation 180 is disposed between the conductor 174 and the housing 176. An end plate, or cap, 182 is disposed at the outer end of the housing 176, with a central aperture to accommodate the lead 174 and its surrounding insulating ring 184.

The diode 118 is supported in an identical manner as that described above with respect to the diode 120, with the elements constituting the diode support and D.C. bias lead assembly for the diode 118 being identical with their counterpart elements 166–184 for the diode 120, and these elements are designated by the same reference numerals as their counterpart elements except for the addition of a prime designation. The lead 174′ extending out of the housing 176′ may, of course, be connected to a source of D.C. bias potential such as +V of FIG. 1.

An output coupling probe 122, terminating in a plate-like portion 186, projects into the waveguide resonator 160 at a distance from the diodes 118 and 120 which insures maximum power output. As shown in FIG. 2, the probe 122 constitutes part of an output coupling assembly 190 adapted to connect with an output coaxial cable (not shown), and which output coupling assembly is identical to the input coupling assembly 110 described above. Therefore, the various elements comprising the output coupling assembly 190 will not be described in detail, it being understood that they may be identical to corresponding elements in the input coaxial coupling assembly 110. It is pointed out, however, that the output coupling assembly may take other appropriate forms, for example, the probe 122 may be fixed with respect to the cavity 160 instead of having an adjustable penetration depth within the cavity 160.

An adjustable tuning element, shown as a screw 192, may extend into the waveguide resonator 160 opposite the output probe 122 to vary the resonant frequency of the cavity 160 and also to provide additional adjustment of the output coupling. Further adjustment of the resonant frequency of the cavity 160 may be obtained by varying a similar tuning element, or screw, 194. Additional adjustment of the resonant frequency of the cavity 160 may be obtained by longitudinal movement of a short circuiting plug 196 disposed at the end of the waveguide 160 remote from the strip line assembly 112. The probe 122, the tuning elements 192 and 194, and the short circuiting plug 196 also provide an output impedance level control for optimizing the impedance match between the output transmission line and the varactor diodes 118 and 120.

Figure 5:
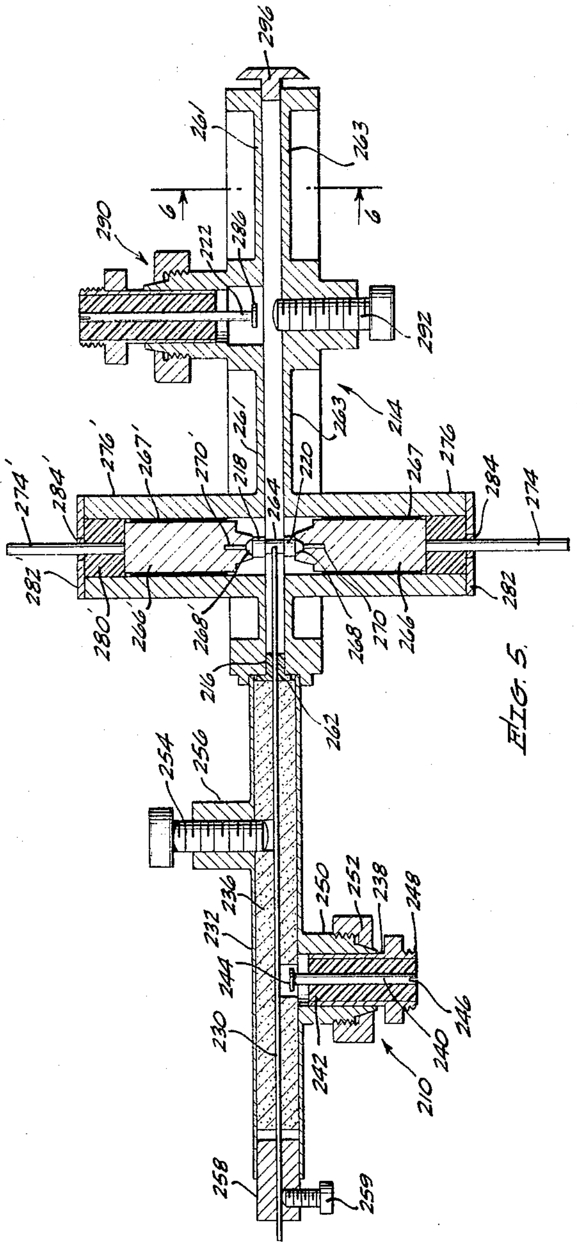
FIG. 5 is a longitudinal sectional view of a frequency doubler provided in accordance with another embodiment of the present invention.
Figure 6:
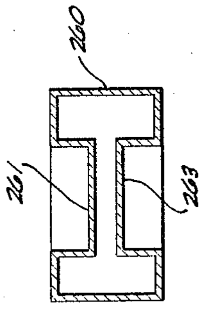
FIG. 6 is a cross-sectional view taken along line 6—6 of FIG. 5.

The embodiment described above with respect to FIGS. 2–4 is especially suitable for operation at frequencies in a preselected range, for example, with an input frequency of around 3700 mc. However, the principles of the present invention are applicable to devices capable of operating over a variety of frequency ranges; and an embodiment especially suitable for use at somewhat lower frequencies, for example an input frequency of around 1850 mc., is illustrated in FIGS. 5–6. It may be observed that the embodiment of FIGS. 5–6 is similar in many respects to that of FIGS. 2–4. Therefore, those elements in the embodiment of FIGS. 5–6 which are substantially the same as corresponding elements in the embodiment of FIGS. 2–4 will not be redescribed in detail; rather these elements are designated by the same second and third reference numeral digits as their counterpart elements in the embodiment of FIGS. 2–4 and are prefaced by the digit "2" instead of "1" to facilitate reference to the detailed description of the corresponding parts as given above with respect to FIGS. 2–4.

In the embodiment of FIGS. 5–6 a ridged waveguide resonator 260, with oppositely disposed inwardly projecting longitudinal ridges 261 and 263, is provided rather than a rectangular cross-section waveguide. In addition, the diodes 218 and 220 may be mesa-type diodes. The slotted diode supporting members 266 and 266′ may be more elongated than their counterpart elements 166 and 166′ in the embodiment of FIGS. 2–4, and the lateral surfaces of the elements 266 and 266′ may be covered with a thin plastic tape 267 and 267′, respectively, for example that sold under the trademark "Mylar." It may also be observed that in the embodiment of FIGS. 5–6 the tuning screw 254 for the strip line assembly 212 is not aligned with the input coupler assembly 210, and no exact counterpart for the tuning screw 194 is provided in the embodiment of FIGS. 5–6.

In the event that the operation frequencies for the embodiments of FIGS. 2–4 and 5–6 are selected so that the output frequency of the doubled of FIGS. 5–6 is the same as the input frequency of the doubler of FIGS. 2–4, the doublers may be readily cascaded to provide a frequency quadrupler. Moreover, it should be apparent that additional doublers utilizing the principles of the present invention may be connected in cascade to produce longer frequency multiplier chains.

The operation of the present invention will now be explained with reference to FIG. 1, it being understood that the principles of operation for the embodiments of both FIGS. 2–4 and 5–6 are the same and are encompassed in the explanation. The input microwave signal whose frequency is to be doubled is applied to the coaxial input connection 10 for coupling to the strip transmission line 12. The wave propagated along the strip transmission line 12 couples to the varactor diodes 18 and 20, and these diodes develop therefrom current and voltage signals at both odd and even harmonics of the frequency of the signal propagated along the strip line 12. The odd harmonic signals developed by the respective diodes are in phase with each other, while the even harmonic signals are 180° out of phase with one another. For a more detailed explanation of the phenomena involved in the development of these harmonic signals by the diodes 18 and 20, reference may be made to patent applications Ser. No. 830,866 (now Patent No. 3,076,133) and Ser. No. 11,667 (now Patent No. 3,161,816), by Don R. Holcomb, filed on July 31, 1959, and February 29, 1960, respectively.

On account of the fact that the diodes 18 and 20 are mounted in the waveguide resonator 14 in odd symmetry, the waveguide resonator 14 is excited in an antisymmetric mode. Since the antisymmetric mode contains even harmonics of the input signal frequency and since the waveguide resonator is tuned to that even harmonic at twice the input signal frequency, only that antisymmetric mode at twice the input frequency is coupled by the waveguide resonator 14 to the output probe 22. Thus, a signal at a frequency of twice the input frequency is induced in the coupling probe 22 and is transmitted to the output coaxial transmission line 24.

Antisymmetric mode signals generated in the waveguide resonator 14 by the varactor diodes 18 and 20 are prevented from reaching the input coupler 10 for several reasons: first, on account of the relatively small size of the aperture 16 in the resonator 14; second, on account of the fact that since the strip line 12 is a symmetrical mode propagating device it does not support the propagation of antisymmetric modes; and third, the input assembly is tuned to the input frequency and not to the output frequency. On the other hand, the input signal propagating along the strip transmission line 12 does not directly couple to the probe 22 because the waveguide resonator 14 does not support the propagation of symmetric modes such as those traveling along the strip line 12 and also because the waveguide 14 is tuned to the output frequency and not to the input frequency. Thus, the waveguide resonator 14 serves as both a mode suppressor for the symmetric mode and as a narrow-band filter which prevents frequencies of other than double the input frequency from coupling to the output transmission line. On account of this maximization of desired coupling and minimization of unwanted coupling, a simple, reliable and highly efficient parametric frequency doubler results.

It is to be understood, of course, that although the foregoing disclosure relates only to preferred embodiments of the invention, it is intended to cover all changes and modifications of the examples of the invention herein chosen for purposes of disclosure which do not constitute departure from the spirit and scope of the invention as set forth in the appended claims.

What is claimed is:

1. A microwave frequency doubler comprising: an elongated electrically conductive housing tuned to a first frequency, an electrically conductive strip disposed within and axially aligned with said housing, said strip extending beyond said housing at at least one end thereof, input coupling means for applying input microwave energy at said first frequency to a first portion of said strip, a waveguide resonator tuned to a frequency essentially equal to twice said first frequency and having one of its walls disposed adjacent said one end of said housing, said resonator wall defining an aperture, said strip extending through said aperture and into said waveguide resonator, means disposed about said strip in said aperture for insulating said strip from said resonator wall, first and second varactor diodes mounted in said waveguide resonator with the anode of said first diode and the cathode of said second diode connected together and to a second portion of said strip residing in said waveguide resonator, means for applying a reverse bias potential to each of said first and second varactor diodes, whereby microwave signals in an antisymmetric mode at said second frequency are developed by said diodes and propagated in said waveguide resonator, and output coupling means for extracting microwave energy at said second frequency from said waveguide resonator.

2. A frequency doubler according to claim 1 wherein said input coupling means includes a coaxial connector and means for varying the capacitance between said coaxial connector and said strip.

3. A frequency doubler according to claim 1 wherein a movable short circuiting element is provided along said strip for adjusting the impedance match between said varactor diodes and said input coupling means.

4. A frequency doubler according to claim 1 wherein at least one variable tuning element is provided in said waveguide resonator to adjust the resonant frequency thereof.

5. A frequency doubler according to claim 1 wherein said output coupling means includes a coaxial connector, with the inner conductor thereof extending into said waveguide resonator, and means for varying the coupling between said inner conductor and said waveguide resonator.

6. A frequency doubler according to claim 1 wherein a movable short circuiting element is provided at the end of said waveguide resonator remote from said strip for adjusting the impedance match between said varactor diodes and said output coupling means.

7. A frequency doubler according to claim 1 wherein one end of each of said first and second varactor diodes is mounted on an electrically conductive support insulated from said waveguide resonator, with a conductive sleeve disposed between and in contact with the other ends of said first and second varactor diodes, and said conductive sleeve contacting the end of said strip residing in said waveguide resonator.

8. A frequency doubler according to claim 1 wherein said varactor diodes are of gallium-arsenide and wherein the cross-section of said waveguide resonator is rectangular.

9. A frequency doubler according to claim 1 wherein said varactor diodes are of the mesa type and said waveguide resonator defines a plurality of inwardly projecting longitudinal ridges.

10. A frequency quadrupler comprising: a first frequency doubler according to claim 1 wherein said varactor diodes are of the mesa type and said waveguide resonator defines a plurality of inwardly projecting longitudinal ridges, and a second frequency doubler according to claim 1 wherein said varactor diodes are of gallium-arsenide and wherein the cross-section of said waveguide resonator is rectangular, said first and second frequency doublers being coupled in cascade with said output coupling means of said first frequency doubler coupled to said input coupling means of said second frequency doubler.

References Cited by the Examiner

UNITED STATES PATENTS

| | | | |
|---|---|---|---|
| 2,408,420 | 10/1946 | Ginzton | 321—69 |
| 2,441,598 | 5/1948 | Robertson | 333—98 |
| 2,460,109 | 1/1949 | Southworth | 333—98 |
| 2,514,678 | 7/1950 | Southworth | 332—54 |
| 2,817,760 | 12/1957 | Dobberton | 333—98 |
| 2,951,207 | 8/1960 | Hudspeth | 330—4.9 |
| 2,982,922 | 5/1961 | Wilson | 321—69 |
| 3,060,365 | 10/1962 | Crandell | 321—69 |
| 3,085,205 | 4/1963 | Sante | 328—16 |
| 3,127,566 | 3/1964 | Lombardo | 330—4.9 |

OTHER REFERENCES

1962 International Solid State Circuits Conf., Feb. 14, 1962, "Refuse," pp. 18–19.

"Charge Storage Varactors Boost Harmonic Power," by G. Schaffner; Electronics July 13, 1964, pp. 42–47 relied upon.

Uhlir: Proc. I.R.E., June 1958, pp. 1099–1115.

JOHN F. COUCH, *Primary Examiner.*

HERMAN K. SAALBACH, *Examiner.*

C. BARAFF, G. GOLDBERG, *Assistant Examiners.*